US008265394B2

(12) United States Patent
Okazawa (10) Patent No.: US 8,265,394 B2
(45) Date of Patent: Sep. 11, 2012

(54) MULTI-IMAGE FILE EDITING APPARATUS AND MULTI-IMAGE FILE EDITING METHOD

(75) Inventor: Atsuro Okazawa, Hino (JP)

(73) Assignee: Olympus Imaging Corp., Tokyo (JP)

( * ) Notice: Subject to any disclaimer, the term of this patent is extended or adjusted under 35 U.S.C. 154(b) by 836 days.

(21) Appl. No.: 12/390,005

(22) Filed: Feb. 20, 2009

(65) Prior Publication Data

US 2009/0226088 A1    Sep. 10, 2009

(30) Foreign Application Priority Data

Mar. 4, 2008 (JP) ................................. 2008-053835

(51) Int. Cl.
*G06K 9/34* (2006.01)
(52) U.S. Cl. ...................................................... 382/173
(58) Field of Classification Search .................. None
See application file for complete search history.

(56) References Cited

U.S. PATENT DOCUMENTS

| 2002/0099853 A1* | 7/2002 | Tsujii et al. ................... 709/247 |
| 2004/0090533 A1* | 5/2004 | Dow et al. ................... 348/220.1 |
| 2005/0172219 A1* | 8/2005 | Hintermeister et al. ....... 715/513 |
| 2005/0243187 A1 | 11/2005 | Watanabe et al. |
| 2007/0036444 A1* | 2/2007 | Yoshida ........................ 382/232 |
| 2008/0069540 A1* | 3/2008 | Takagi et al. ................. 386/117 |

FOREIGN PATENT DOCUMENTS

| JP | 07-245723 | 9/1995 |
| JP | 2000-236542 | 8/2000 |
| JP | 2005-108107 | 4/2005 |
| JP | 2005-252754 | 9/2005 |

* cited by examiner

*Primary Examiner* — Bhavesh Mehta
*Assistant Examiner* — Nirav G Patel
(74) *Attorney, Agent, or Firm* — John C. Pokotylo; Straub & Pokotylo (57) ABSTRACT

A multi-image file includes one representative main image data and one or more sub-image data other than the main image data in one file. Each of the image data is provided with a header area. When dividing the multi-image file into individual image files, related information indicative of a relationship between the main image data and the one or more sub-image data is recorded in the header area of the main image data and in the header area of each of the one or more sub-image data. The related information is necessary for reconstructing the multi-image file from a plurality of divided image data and includes, for example, a total number of the sub-images, an image identification number, main image file identification information, an image type, and the like.

9 Claims, 10 Drawing Sheets

FIG.10
RELATED ART hogehoge.JPG

MULTI-IMAGE FILE EDITING APPARATUS AND MULTI-IMAGE FILE EDITING METHOD

This application claims benefit of Japanese Application No. 2008-053835 filed in Japan on Mar. 4, 2008, the contents of which are incorporated by this reference.

BACKGROUND OF THE INVENTION

1. Field of the Invention

The present invention relates to a multi-image file editing apparatus and a multi-image file editing method for editing a multi-image file including main image data and one or more sub-image data.

2. Description of Related Art

At the time of shooting images, one image is shot for each scene in some cases, while in other cases a plurality of images are shot by a predetermined shooting sequence such as sequential shooting, panoramic shooting, auto-bracket shooting, and multiple-viewpoint shooting (what is called stereoscopic vision image shooting). Since recent digital cameras, in particular, have improved sequential shooting performance, the number of images obtained by sequential shooting tends to dramatically increase. However, if images obtained by sequential shooting are recorded as individual files, respectively, file management is likely to be very cumbersome.

To eliminate such disadvantage, a technique is proposed to obtain a high convenience in file operation and management by handling a group of images which are obtained by such a predetermined shooting sequence and the like and highly related to one another as a single file rather than handling the group of images as individual files.

Incidentally, digital still images obtained by image pickup operation are saved as JPG files complying with the JPEG standard in many cases at present, and "JPG" is used as the extension of the files. In order to maintain file compatibility with existing image processing apparatuses and JPG applications which are designed to handle the JPG files, it is required to append the extension "JPG" to the files. Furthermore, it is also required that the internal structure of the files complies with the Exif standard as a de facto standard in digital cameras, and the like.

Techniques that satisfy these requirements at the same time include one disclosed in Japanese Patent Application Laid-Open Publication No. 2005-252754, for example. The technique disclosed in the publication is such that a plurality of JPEG images are put together into one file to prevent an increase in the number of files, and a main image (one main (representative) image among the plurality of images put together into the one file) is stored at the head of the file in a format complying with the Exif standard, and the extension "JPG" is appended to the file itself.

Figure 10:
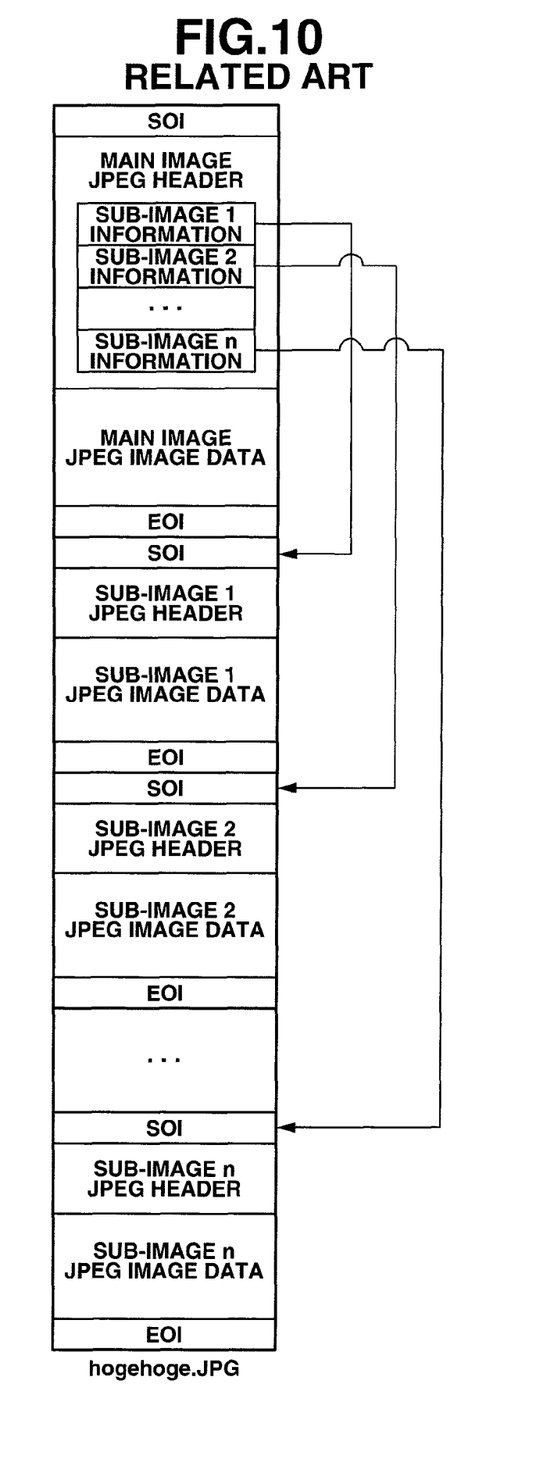
FIG. 10 is a view showing an exemplary configuration of a conventionally proposed image file which is capable of storing a plurality of JPEG image data.

Specifically, the file as shown in FIG. 10 is created. FIG. 10 is a view showing an exemplary configuration of a conventionally proposed image file which is capable of storing a plurality of JPEG image data. The image file can store one JPEG image data as the main image and other n (n is an integer equal to or larger than 1) pieces of JPEG image data as sub-images other than the main image, for example. A JPEG header is added to each of the JPEG images, and one set composed of the JPEG header and the JPEG image data is configured to be sandwiched between an image start marker SOI and an image end marker EOI. In such a configuration, the image stored at the head of the image file is the main image. In the JPEG header of the main image are stored information on each of the sub-images stored in the same image file (for example, a total number of the sub-images, identification numbers of the sub-images (which number of the sub-images in the image file), pointers to the sub-images, image type information of the sub-images (which is information indicative of the relationship between the main image data and one or more sub-images at the time of shooting, specifically, information indicating that each of the sub-images is obtained by panoramic shooting or bracket shooting and the like). In addition, the extension of the file name is "JPG" (the file name of the example shown in the drawing is "hogehoge.JPG").

Such a configuration employed in the file for storing a plurality of JPEG image data, in which the extension is "JPG" and the part from the head of the file to the end of the main image has the same structure as that of the existing JPEG format, maintains compatibility with existing image processing apparatuses and applications that handle JPG files. Since a plurality of image data are stored in one file, there are advantages that the number of files can be reduced and file management becomes easier. The file, one example of which is shown in FIG. 10, i.e., the image file for storing a plurality of image data in one file is hereinafter called "multi-image file" as needed.

To the contrary, the existing Exif standard is defined such that only one JPEG image, excepting a thumbnail image, is stored for one JPG file.

The file for storing a plurality of images as disclosed in the Japanese Patent Application Laid-Open Publication No. 2005-252754 can be displayed, edited and saved using the existing image processing apparatus and application as described above, since the main image at the head of the file maintains compatibility with an existing JPG file. However, when the JPG file as disclosed in the publication is edited and saved using the existing image processing apparatus and application complying with the above-described current Exif standard, there is a possibility that only the main image is saved but sub-images other than the main image are deleted or damaged.

Therefore, in order to reproduce, edit, or distribute images using the existing image processing apparatus and application, a utilizing method for dividing the images in the multi-image file into individual JPG files can be considered. The multi-image file as disclosed in the Japanese Patent Application Laid-Open Publication No. 2005-252754 has a configuration in which a plurality of JPG files are united as one file, thereby facilitating such a division.

However, if once the multi-image file is divided, the relationship among image groups which are managed as one file is lost. Therefore, it is very difficult to unite the divided files into one again.

SUMMARY OF THE INVENTION

An object of the present invention is to provide a multi-image file editing apparatus and a multi-image file editing method that enable a multi-image file to be divided such that reuniting of the files can be performed in a relatively easy way.

In brief, the present invention is a multi-image file editing apparatus for editing a multi-image file including main image data representing one main image which is a representative of a plurality of images and one or more sub-image data representing one or more sub-images other than the main image, each of the main image data and the one or more sub-image data being provided with a header area, and the multi-image file editing apparatus includes: a related information recording section for recording related information indicative of a relationship between the main image data and the one or more sub-image data in the header area of the main image data and the header area of each of the one or more sub-image data; and an image data dividing section for dividing the main image data and the one or more sub-image data included in the multi-image file into individual image files.

In addition, the present invention is a multi-image file editing method for editing a multi-image file including main image data representing one main image which is a representative of a plurality of images and one or more sub-image data representing one or more sub-images other than the main image, each of the main image data and the one or more sub-image data being provided with a header area, and the multi-image file editing method includes steps of: recording related information indicative of a relationship between the main image data and the one or more sub-image data in the header area of the main image data and the header area of each of the one or more sub-image data; and dividing the main image data and the one or more sub-image data included in the multi-image file into individual image files.

The above and other objects, features and advantages of the invention will become more clearly understood from the following description referring to the accompanying drawings.

DETAILED DESCRIPTION OF PREFERRED EMBODIMENT

Hereinafter, an embodiment of the present invention will be described with reference to the drawings.

Embodiment 1

Figure 1:
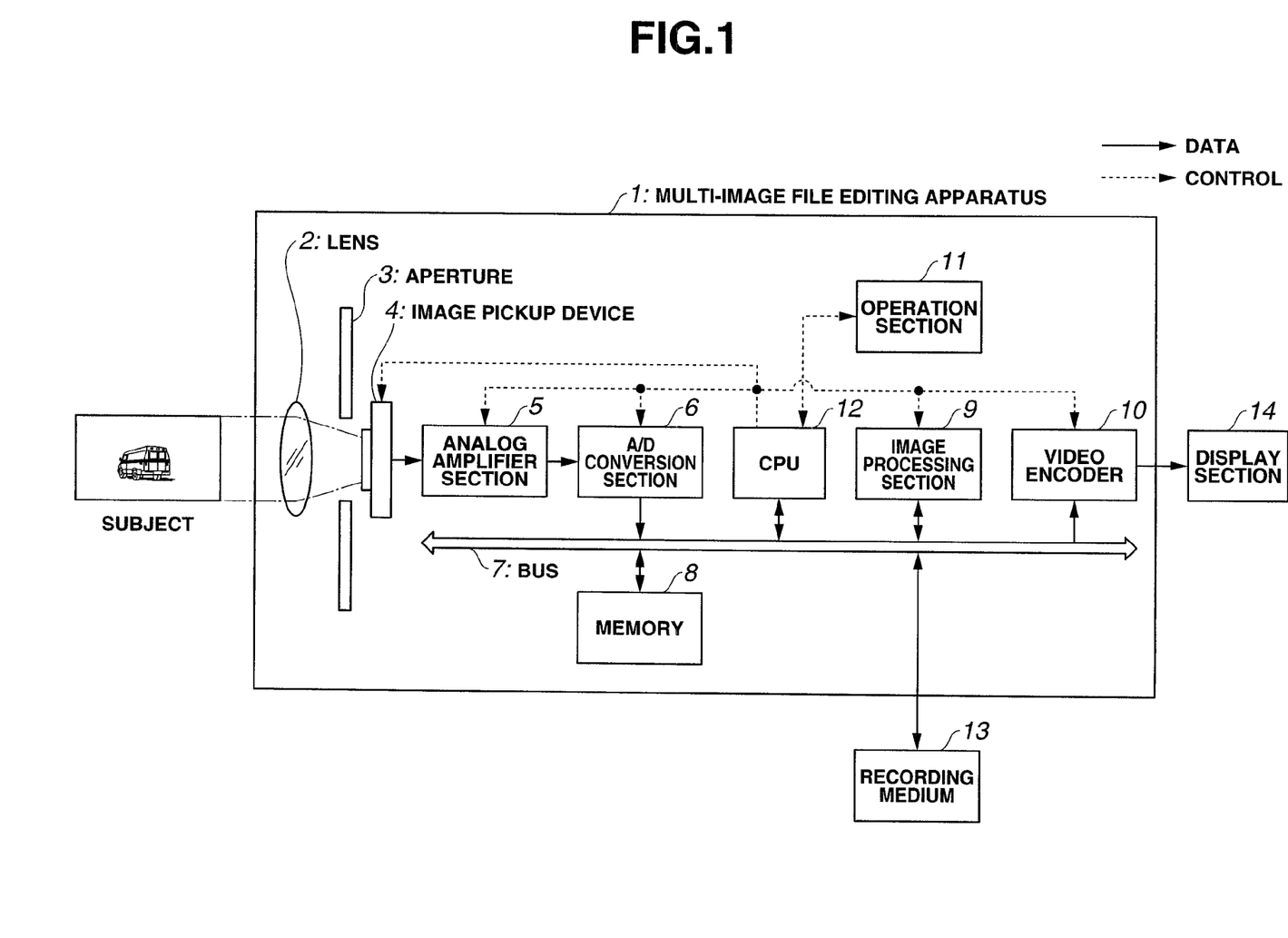
FIG. 1 is a block diagram showing an exemplary configuration of a multi-image file editing apparatus according to embodiment 1 of the present invention.

FIGS. 1 to 9 show the embodiment 1 of the present invention. FIG. 1 is a block diagram showing an exemplary configuration of a multi-image file editing apparatus.

A multi-image file editing apparatus 1 has a function of picking up images and is configured as a digital camera, for example.

That is, the multi-image file editing apparatus 1 includes: a lens 2; an aperture 3; an image pickup device 4; an analog amplifier section 5; an A/D conversion section 6; a bus 7; a memory 8; an image processing section 9; a video encoder 10; an operation section 11; and a CPU 12. In addition, the multi-image file editing apparatus 1 is connected to a recording medium 13 and a display section 14.

The lens 2 is to form an optical image of a subject on an image pickup device 4.

The aperture 3 is to adjust brightness of the optical image to be formed, by defining a passing range of a light flux which emitted from the lens 2 and reaches the image pickup device 4. The lens 2 and the aperture 3 configure an image pickup optical system.

The image pickup device 4 photoelectrically converts the formed optical image to generate an analog electric image signal and outputs the generated analog image signal.

The analog amplifier section 5 amplifies the analog image signal outputted from the image pickup device 4.

The A/D conversion section 6 converts the analog image signal amplified by the analog amplifier section 5 into a digital image.

The digital image converted by the A/D conversion section 6 is stored in the memory 8 via the bus 7. The bus 7 is used when each of the sections transmits and receives data, and connected with the A/D conversion section 6, the memory 8, the image processing section 9, the video encoder 10, and the CPU 12, and further connectable with the recording medium 13.

The memory 8 is configured as a storage section capable of relatively high-speed access, such as DRAM. The memory 8 is used not only as a buffer for storing the image from the A/D conversion section 6, the image processed by the image processing section 9, the image read out from the recording medium 13, and the like, but also as a working area for the CPU 12.

The image processing section 9 performs an image processing on the digital image stored in the memory 8 to generate image data for recording (the present embodiment assumes JPEG data), and writes the data back in the memory 8 again. In addition, the image processing section 9 generates also image data for display, as needed, and stores the generated image data for display in the memory 8.

A header and the like are added by the CPU 12 to the image data for recording generated by the image processing section 9, to generate an image file.

The recording medium 13 records the generated image file in a nonvolatile manner based on a control by the CPU 12, and is configured of a flash memory and the like, for example. The recording medium 13 is configured as an external recording media such as a CF card and an SD card, and is attachable/detachable to and from the multi-image file editing apparatus 1.

The video encoder 10 reads out the image data for display stored in the memory 8, converts the read-out image data into a video signal and the like, and outputs the video signal and the like to the outside. The video encoder 10 is connected with the display section 14 as an external apparatus such as a liquid crystal display apparatus (LCD) or a television apparatus (TV) to display an image on the display section 14.

The operation section 11 is for a user to input various operations to the multi-image file editing apparatus 1. The possible operations by the operation section 11 include for example: an on/off operation of a power supply; a release operation for instructing to start image shooting; a mode selection operation for selecting shooting modes such as a sequential shooting mode, a panoramic shooting mode, a multiple-viewpoint shooting mode, an auto-bracket shooting mode; and a main image selection operation for selecting a main image from among a plurality of picked-up images.

The CPU 12 is a control section for integrally controlling the sections in the multi-image file editing apparatus 1. Furthermore, as described above, the CPU 12 performs a processing of generating an image file by creating a header and adding the header to the image data for recording, and control to record the generated image file in the recording medium 13, and serves also as a related information recording section, an image data dividing section, and a multi-image file reconstructing section. In addition, the CPU 12 also performs a processing of selecting a main image from among a plurality of images by automatic processing or manual operation.

In the present embodiment, it is assumed to record a series of image groups shot when a shooting mode in which a plurality of images highly related to one another are obtained is set, as a multi-image file, in the recording medium 13, the shooting mode including the sequential shooting mode, panoramic shooting mode, multiple-viewpoint shooting mode, and auto-bracket shooting mode.

Figure 2:
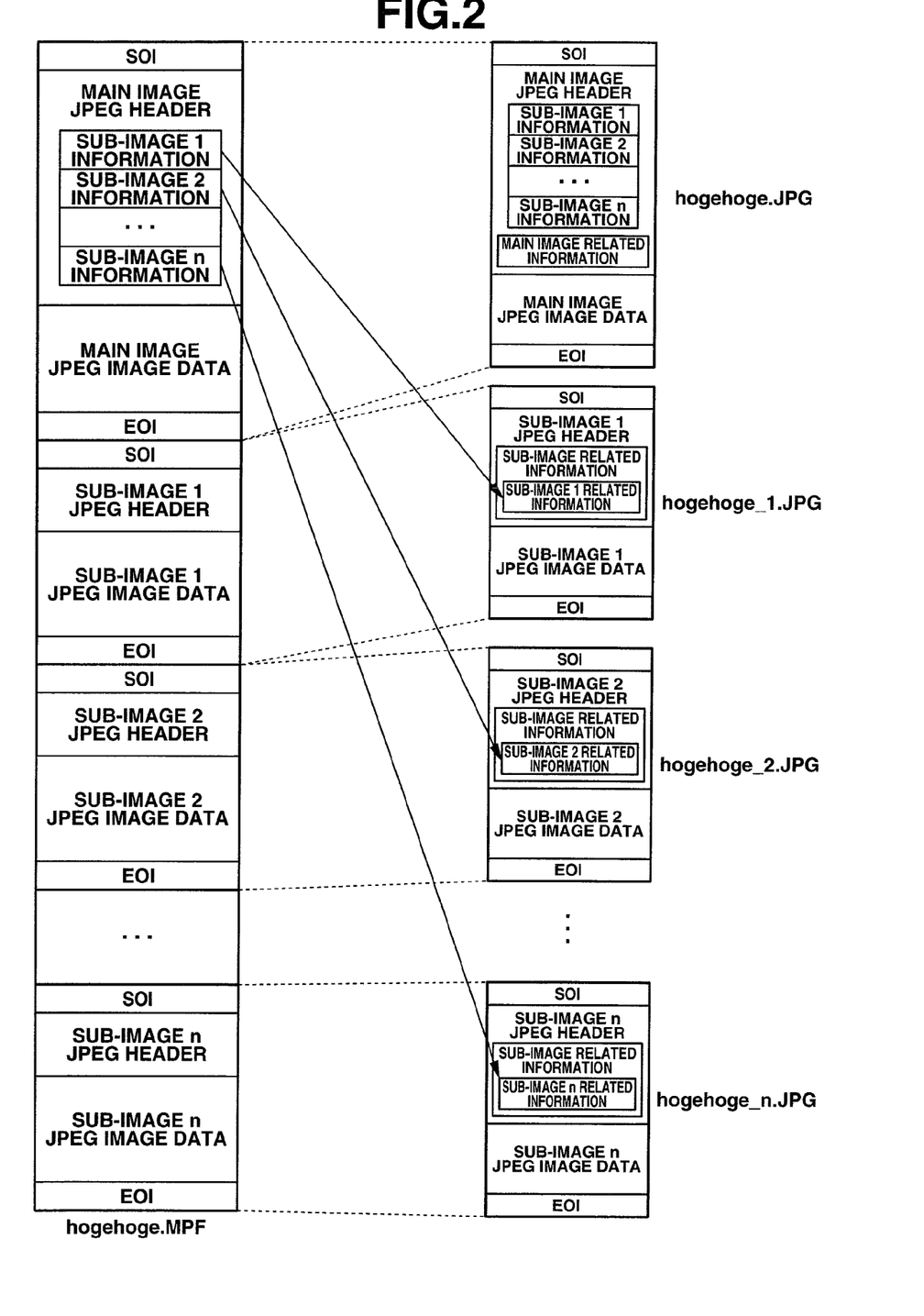
FIG. 2 is a view showing a brief overview of division of a multi-image file in the embodiment 1.
Figure 4:
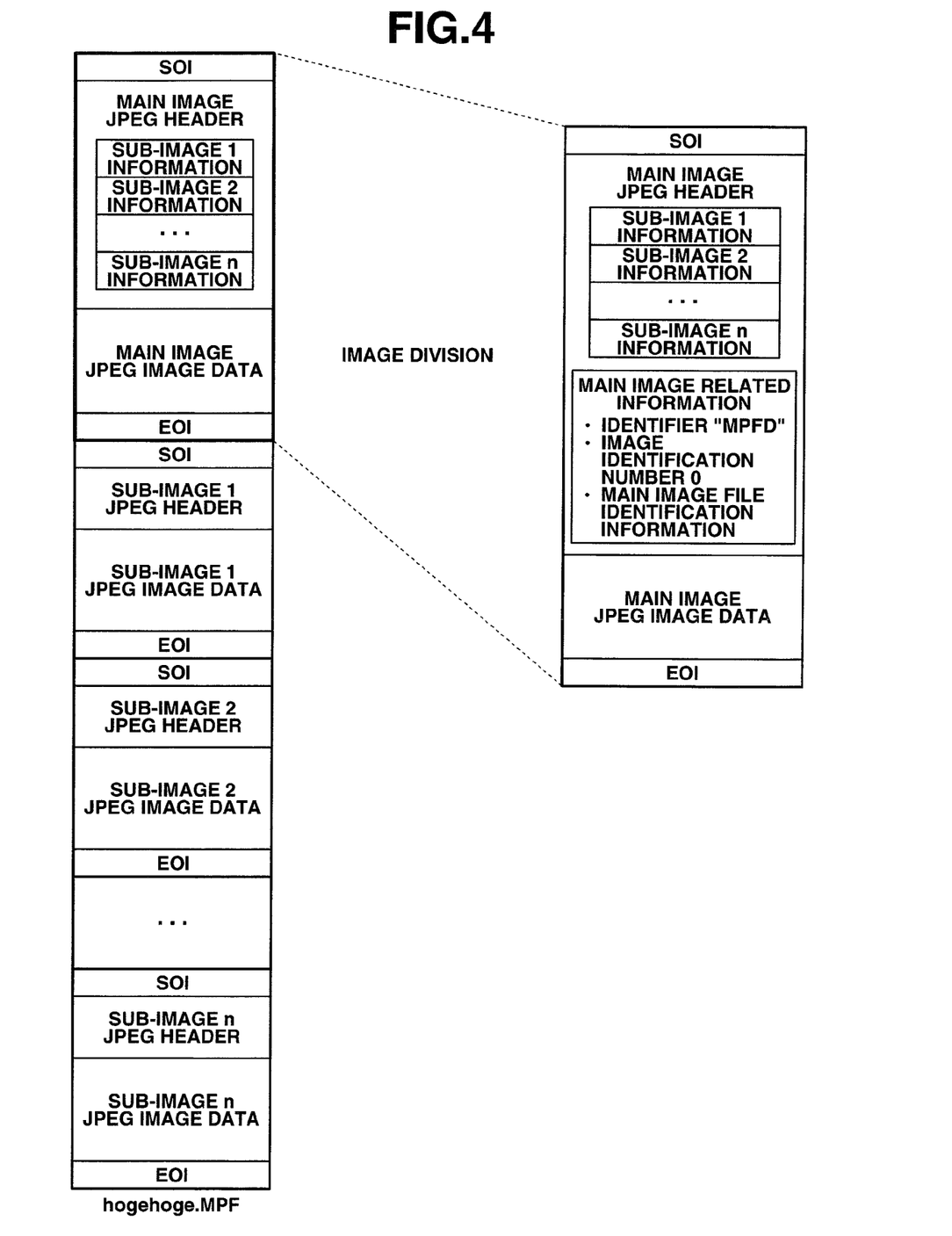
FIG. 4 is a view showing a configuration of a main image file obtained by division from the multi-image file in the embodiment 1.
Figure 5:
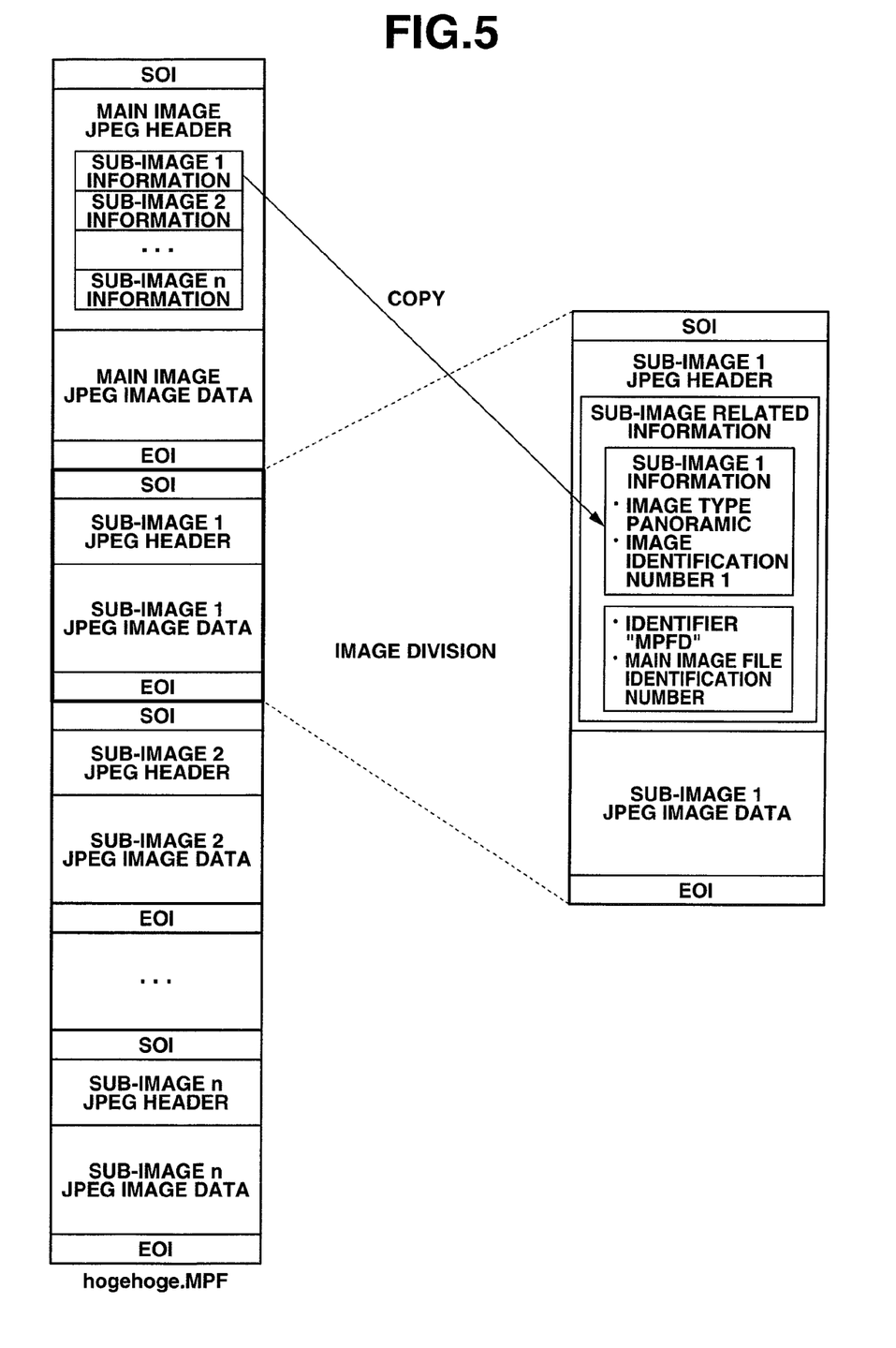
FIG. 5 is a view showing a configuration of sub-image files obtained by division from the multi-image file in the embodiment 1.

FIG. 2 is a view showing a brief overview of division of the multi-image file. FIG. 4 is a view showing a configuration of the main image file obtained by division from the multi-image file. FIG. 5 is a view showing a configuration of sub-image files obtained by division from the multi-image file.

First, the left side of FIG. 2 is a view showing the configuration of the multi-image file obtained by shooting images in the above-described shooting mode and recorded in the recording medium 13. The configuration of the multi-image file shown on the left side of FIG. 2 is the same as that of the multi-image file described with reference to FIG. 10.

That is, the multi-image file stores one JPEG image data as a main image at the head thereof and subsequently stores n (n is an integer equal to or larger than 1) pieces of JPEG image data as sub-images. A JPEG header is added to each of the JPEG image data. One set composed of the JPEG header and the JPEG image data is configured to be sandwiched between an image start marker SOI and an image end marker EOI.

In the multi-image file configured as such, information on each of the sub-images stored in the same file is stored in the JPEG header of the main image which is stored at the head of the file. Some examples of the information on the sub-images include a total number of the sub-images, identification numbers of the sub-images (which number of the sub-images in the multi-image file, and the like), pointers to the sub-images, types of the sub-images (the sub-images are obtained in which of the above-described shooting modes, and the like). In addition, unlike the example shown in FIG. 10, the extension of the multi-image file name is MPF in the present embodiment (the file name is "hogehoge.MPF" in the example shown in the drawing). However, the extension name is just one example, and it is needless to say that another extension may be used. Since the present embodiment assumes to divide the multi-image file into a plurality of JPG files, the JPG files after division can be processed using a multi-image non-compliant conventional apparatus, software, and the like. Therefore, there is no need to use "JPG" as the extension of the multi-image file to maintain the compatibility with the conventional JPG files. Accordingly, a unique extension indicative of the multi-image file is appended in this embodiment.

Next, the right side of FIG. 2 is a view showing the configuration in the case where the images included in the multi-image file shown on the left side of FIG. 2 are divided respectively as individual JPG files.

The image data, each sandwiched between the image start marker SOI and the image end marker EOI, are divided into separate JPG files, respectively. The main image is appended with the same file name, except for the extension, as that of the multi-image file and the extension is "JPG (the file name is "hogehoge. JPG" in the example shown in the drawing). In addition, the sub-image, though the extension thereof is "JPG", is appended with the file name, except for the extension, created by adding an under bar and the number of the sub-image to the file name, except for the extension, of the multi-image file (the file name of the sub-image k (k=1, ..., n) is "hogehoge_k.JPG" in the example shown in the drawing).

In addition, related information necessary for uniting the files later to reconstruct the multi-image file is added at the time of file division in the JPEG header of each of the JPG files after division.

As shown in FIG. 4, the information on the sub-images 1 to n, which was recorded in the multi-image file, is continuously recorded in the JPEG header of the main image file including the main image data, and in addition, the main image related information is added in the header at the time of file division. Examples of the information recorded in the main image related information include an identifier for identifying the image file divided from the multi-image file (the identifier "MPFD" in FIG. 4 and in FIG. 6 to be described later (however, the identifier is only one example)), the identification number "0" indicating the order of the image in the multi-image file (the identification numbers of the sub-images are set as 1, ..., n, and the like, so that the identification number of the main image is set as "0"), and main image file identification information (for example, an unique ID, the file name itself of the main image file, or the like) for identifying the main image based on the sub-images after division.

On the other hand, as shown in FIG. 5, sub-image related information is added at the time of file division in the JPEG header of the sub-image file including sub-image data. With reference to the sub-image k information recorded in the main image JPEG header, the sub-image related information of the sub-image k (k=1, ..., n) is basically copied and recorded (the reason why the information is basically required to be copied and recorded is to enable at least the main image JPEG header to be restored even if the JPG file recording the main image data does not exist when reconstructing the multi-image file later. However, there is no need to copy the information which is not worth copying. For example, the pointers to the sub-images are necessary in the multi-image file. However, since the pointers are recorded in other parts of the JPEG headers in the divided JPG files, there is no need to copy the pointers in particular). Examples of the sub-image k information which is copied and recorded include the total number of the sub-images, the identification numbers of the sub-images (which number of the sub-images in the multi-image file, and the like), the types of the sub-images (the sub-images are obtained in which of the above-described shooting modes, and the like).

Furthermore, in the sub-image related information are recorded the identifier for identifying the image file divided from the multi-image file (the identifier is "MPFD" in the examples shown in FIG. 5 and FIG. 7 to be described later and is the same as the identifier appended to the main image shown in FIG. 4 and FIG. 6), and the main image file identification information (as exemplified above, the unique ID appended to the main image or the file name itself of the main image file) for identifying the main image after division based on the sub-images.

Figure 3:
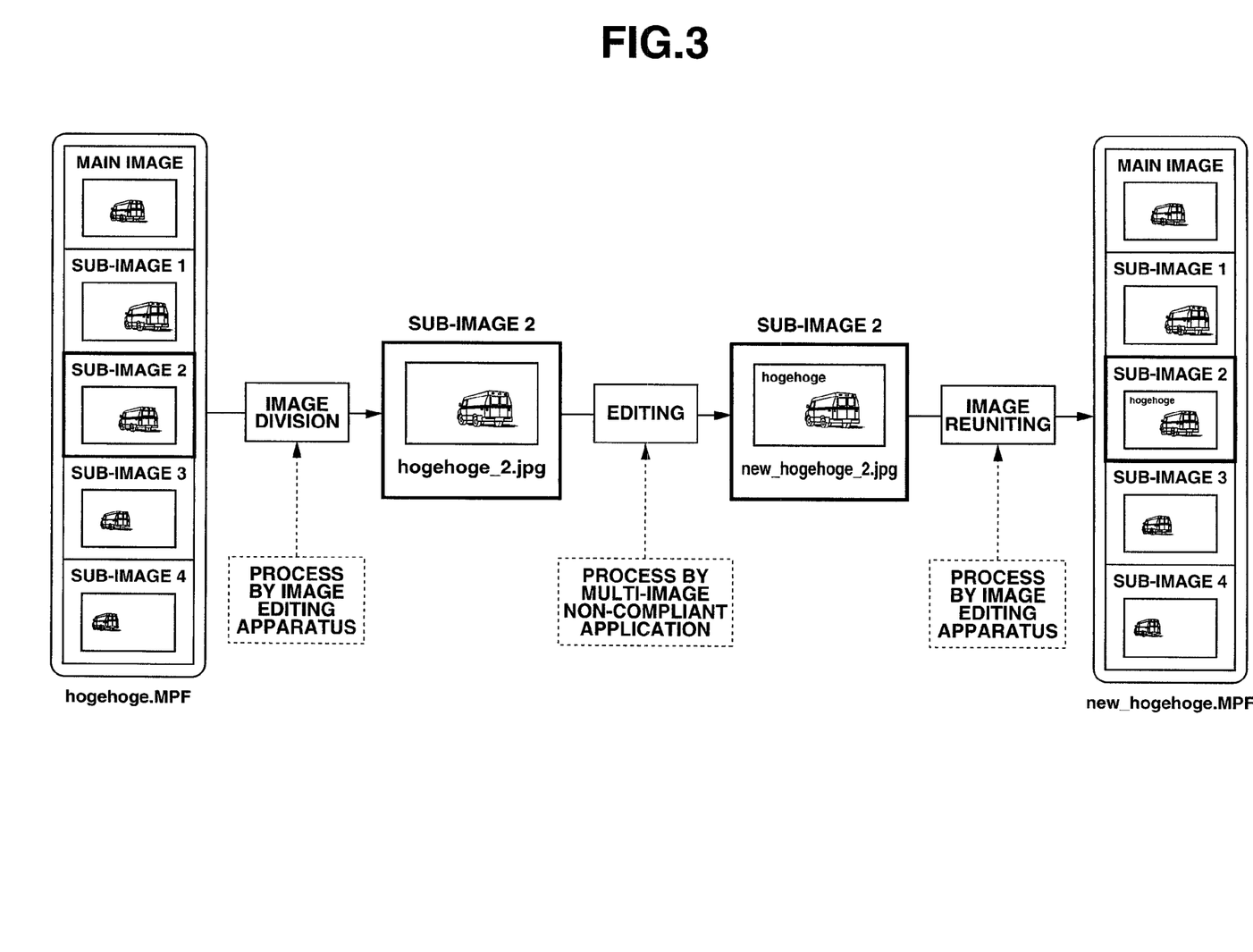
FIG. 3 is a view showing a flow of procedures of dividing images included in the multi-image file, editing the divided images, and then uniting the divided and edited images to reconstruct the multi-image file in the embodiment 1.

Next, FIG. 3 is a view showing a flow of procedures of dividing the images included in the multi-image file, editing the divided images, and then uniting the divided and edited images to reconstruct a multi-image file.

In the multi-image file editing apparatus 1 as shown in FIG. 1, the CPU 12 reads out the multi-image file (the file name is "hogehoge. MPF" in this example) as shown on the left side of FIG. 2 from the recording medium 13 to store the multi-image file in the memory 8, adds the main image related information and the sub-image k related information to the main image JPEG header and to the sub-image k JPEG header, respectively, and divides the multi-image file. As a result, a plurality of JPG files as shown on the right side of FIG. 2 are generated for the respective image data. The plurality of JPG files thus generated are recorded again in the recording medium 13.

By connecting the recording medium 13 to a personal computer (PC), for example, and executing an image editing processing program and the like for editing existing JPG files on the PC, image editing processing is performed (however, the image editing may be performed using a dedicated image editing apparatus other than the PC or an image editing function equipped in a digital camera and the like. That is, there is no limitation placed on the apparatus and the like for performing the image editing). FIG. 3 shows an example of editing the JPG file of the sub-image 2 (the file name before editing is "hogehoge_2.JPG" in the example). However, also after the editing processing, it is assumed that the sub-image related information remains in the JPEG header of the sub-image 2 (the file name after the editing is assumed to be "new_hogehoge_2.JPG").

After that, the recording medium 13 recording the main image file and the sub-image 1, 3, and 4 files, which are not subjected to the editing processing, and the file of the sub-image 2 subjected to the editing processing ("new_hogehoge_2.JPG") is connected again to the multi-image file editing apparatus 1 as shown in FIG. 1.

Then, by performing an image reuniting processing in the multi-image file editing apparatus 1, the multi-image file in which the sub-image 2 before editing has been replaced with the sub-image 2 after editing is created (the file name is "new_hogehoge.MPF" in the example) and the processing is terminated.

Figure 6:
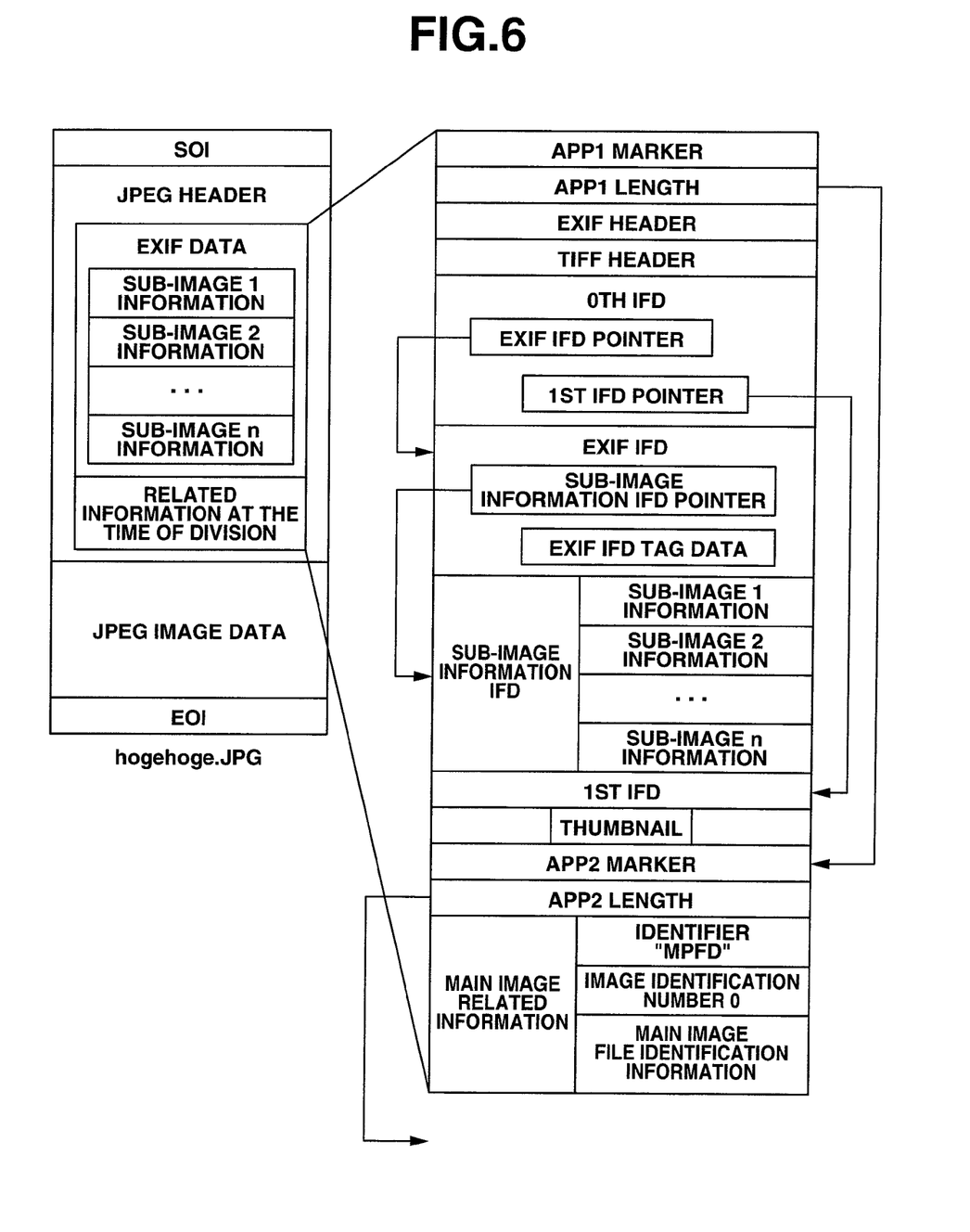
FIG. 6 is a view showing in detail a header structure of the main image file obtained by division from the multi-image file in embodiment 1.
Figure 7:
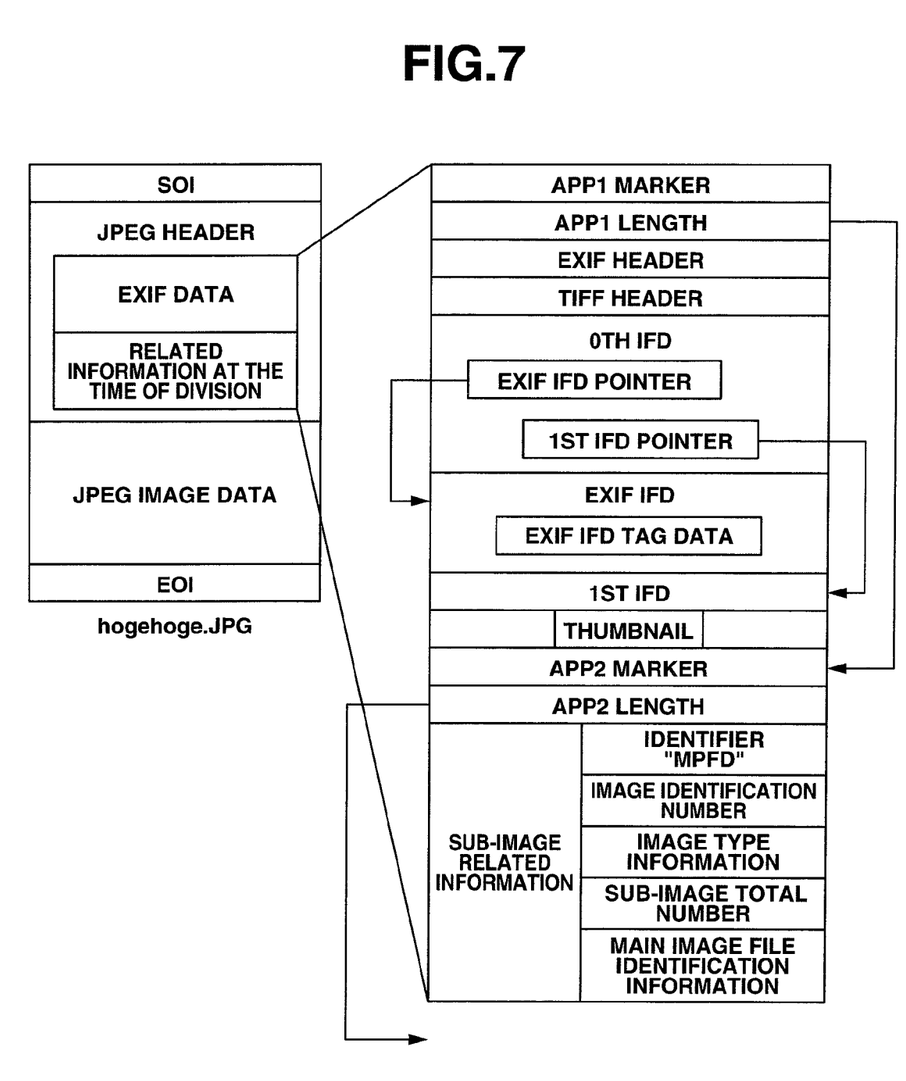
FIG. 7 is a view showing in detail a header structure of the sub-image files obtained by division from the multi-image file in the embodiment 1.

Next, FIG. 6 is a view showing in detail a header structure of the main image file obtained by division from the multi-image file. FIG. 7 is a view showing in detail a header structure of the sub-image files obtained by division from the multi-image file.

The JPEG headers of the JPG files obtained by division comply with the Exif standard and include an APP1 marker area and App2 marker area. In the APP1 marker area is recorded the Exif data recorded in the header of the normal JPG file. In the App2 marker area is recorded related information at the time of division (information necessary for reconstructing the image file in a multi-image format from the plurality of JPG files obtained by division).

As shown on the right sides of FIGS. 6 and 7 in an enlarged manner, the App1 marker area includes an APP1 marker, an APP1 Length, an Exif header, a TIFF header, a 0th IFD, an Exif IFD, a 1st IFD, and thumbnail image data. Furthermore, if the image file is the main image file, sub-image information IFD is further included, for example, in a position between the Exif IFD and the 1st IFD in the APP1 marker area.

Referring to the APP1 Length enables the head position of the APP2 marker area, which will be described later, to be calculated.

The 0th IFD includes pointers to the Exif IFD and the 1st IFD.

The Exif IFD includes Exif IFD tag data. In addition, the Exif IFD in the JPEG header of the main image further includes a pointer to the sub-image information IFD. In a position in the JPEG header of the main image pointed by the pointer to the sub-image information IFD are recorded the information on sub-images 1 to n as described above.

Next, the related information at the time of division includes the APP2 marker, the APP2 Length, and the image related information (main image related information in the case of the main image JPG file, and sub-image related information in the case of the sub-image JPG file), and is recorded in a format complying with the Exif standard.

As described above, the position of the APP2 marker is calculated by referring to the APP1 Length.

In addition, referring to the APP2 Length enables the head position of the JPEG image data main body to be calculated.

When the image related information is the main image related information, the identifier "MPFD", the image identification number "0", and the main image file identification information are recorded, as described above.

Furthermore, when the image related information is the sub-image related information, the identifier "MPFD", the image identification number "k" (in the case of the sub-image k (k=1, . . . , n)), the image type information, the total sub-image number (total number of the sub-images), and the main image file identification information are recorded, as described above.

Figure 8:
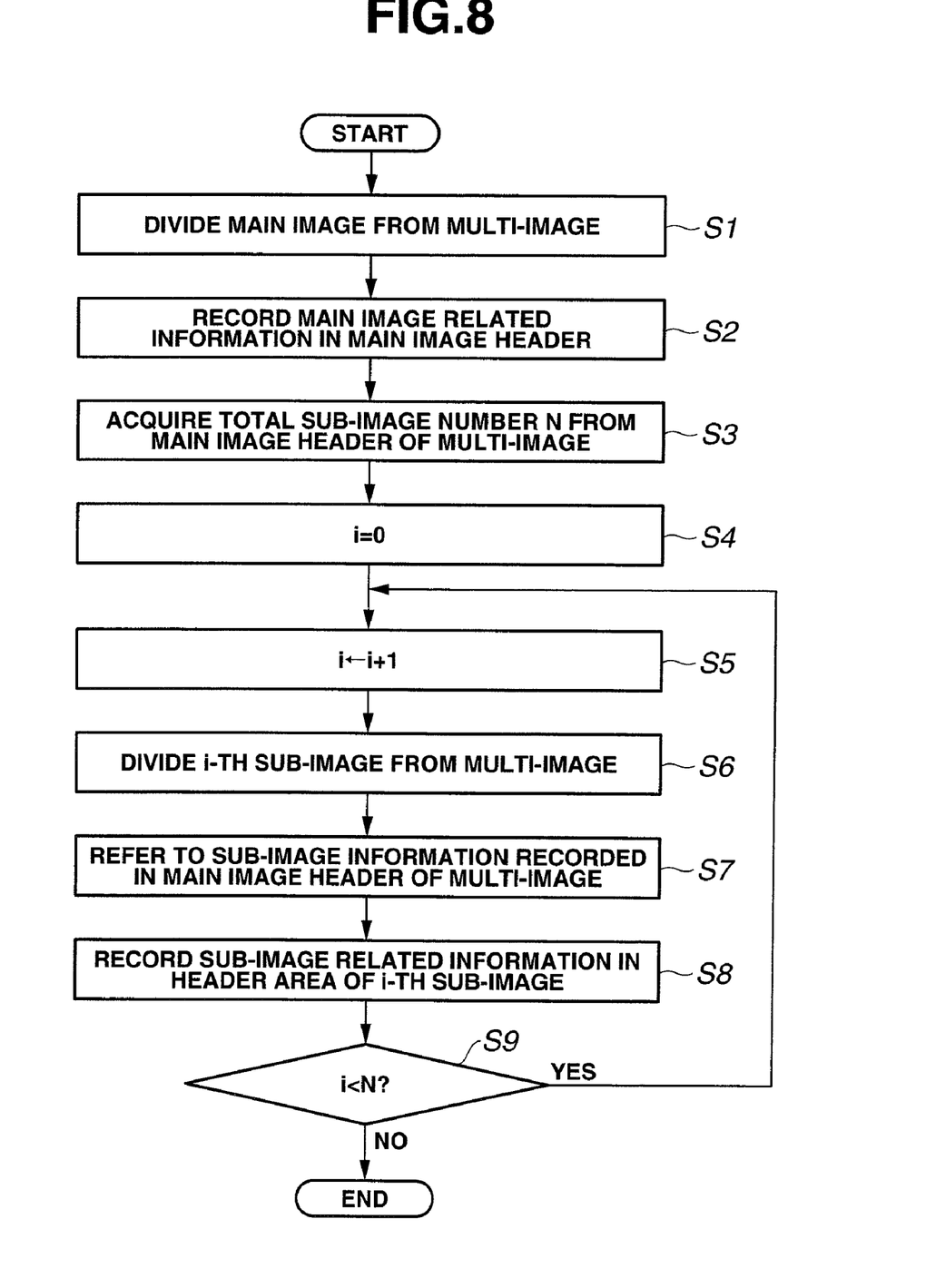
FIG. 8 is a flowchart showing a processing of dividing the multi-image file into JPG file groups in the embodiment 1.

FIG. 8 is a flowchart showing a processing of dividing the multi-image file into JPG file groups. Note that the processing shown in FIG. 8 may be a processing performed in the multi-image file editing apparatus 1, or a processing performed by executing on the computer the multi-image file editing program supporting the division of the multi-image file.

When this processing is started, first the main image (the main image part sandwiched between the image start marker SOI and the image end marker EOI) is divided from the multi-image file (step S1).

The main image related information as described above is added and recorded in the main image JPEG header (step S2).

Next, the total sub-image number N is acquired from the main image JPEG header (step S3), and a variable i is reset to 0 (step S4).

Then, the variable i is increased by 1 (step S5), and thereafter the i-th sub-image is divided from the multi-image file (step S6).

Furthermore, the sub-image i information recorded in the main image JPEG header is referred to (step S7), and the sub-image related information as described above is recorded in the header area of the i-th sub image (step S8).

After that, it is determined whether or not i is smaller than N (step S9). When i is smaller than N, the procedure returns to step S5 and the processing as described above is repeatedly performed on the next sub-image. On the other hand, when i is equal to or larger than N, the processing is terminated.

Note that, in the above description, the image (main image or sub-image) is divided as the JPG file and thereafter the related information is recorded. However, description has been made in this order only for the reason of expediency. Therefore, the order may be reversed, or the division and the recording may be performed at the same time. That is, no limitation is placed especially on the order.

Figure 9:
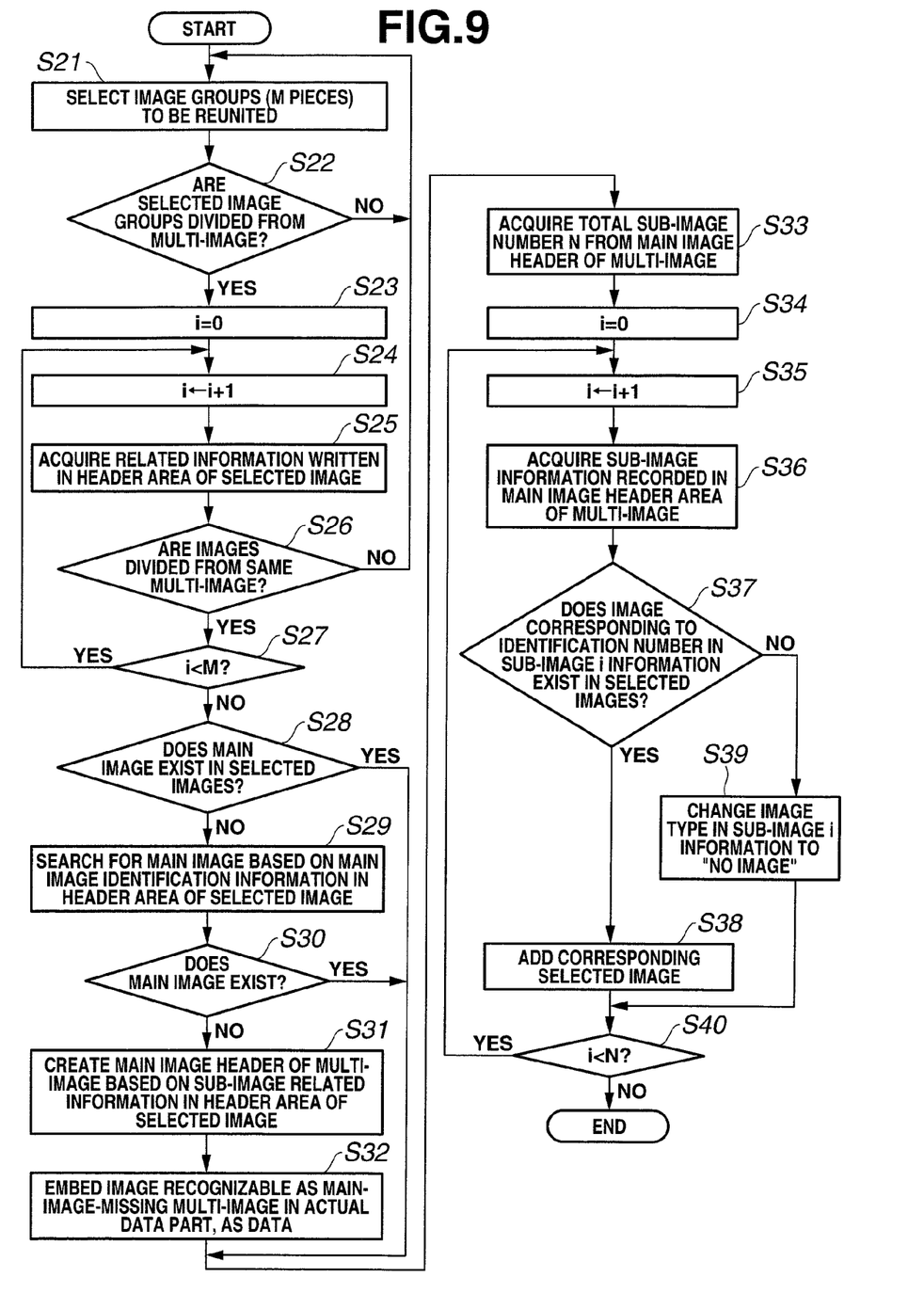
FIG. 9 is a flowchart showing a processing of uniting the JPG file groups obtained by dividing the multi-image file to reconstruct the multi-image file in the embodiment 1.

FIG. 9 is a flowchart showing a processing of uniting the JPG file groups obtained by dividing the multi-image file and reconstructing the multi-image file. Note that the processing shown in FIG. 9 may be a processing performed in the multi-image file editing apparatus 1, or a processing performed by executing on the computer the multi-image file editing program supporting the reconstruction of the multi-image file.

When the processing is started, the image file groups (they are assumed to be the image groups composed of M pieces of JPG files) which are to be reunited are selected in response to the user's operation through the operation section 11, for example (step S21).

Next, it is determined whether or not all the JPG files included in the selected image file groups are the JPG files obtained by division from the multi-image file based on whether or not the identifier "MPFD" is recorded in the header of each of the JPG files (step S22).

When even just one JPG file which is not divided from the multi-image file is included in the selected image file groups, the procedure returns to step S21 to reselect image file groups.

When it is determined that all the JPG files included in the image file groups are the JPG files obtained by division from the multi-image file in the step S22, the variable i is reset to 0 (step S23).

Then, the variable i is increased by 1 (step S24), and thereafter the related information (main image related information or sub-image related information) recorded in the header of the selected i-th JPG file is acquired (step S25).

Subsequently, it is determined whether or not the currently processed JPG file is a JPG file divided from the same multi-image file as the one from which the JPG file whose related information has already been acquired is divided, based on the main image file identification information (based on whether or not the main image file identification information is the same as that in the JPG file whose related information has already been acquired) (step S26).

When it is determined that the JPG file is not one divided from the same multi-image file, the procedure returns to step S21 to reselect the image file groups.

On the other hand, when it is determined that the JPG file is one divided from the same multi-image file, determination is made on whether or not i is smaller than M (step S27). When i is smaller than M, the procedure returns to step S24 and the above-described processing is repeatedly performed on the next image.

Furthermore, when i is equal to or larger than M, determination is made on whether or not the JPG file of the main image is included in the selected image file groups (step S28).

When it is determined that the JPG file of the main image is not included in the selected image file groups, the JPG file of the main image is searched for from the recording medium 13 based on the main image file identification information recorded in the header area of at least one JPG file among the selected image file groups (step S29).

As a result, determination is made on whether or not the JPG file of the main image was found (step S30). When it is determined that the JPG file of the main image was not found, all the JPG files included in the selected image file groups are the JPG files of the sub-images. Therefore, the main image header of the multi-image file is created based on the sub-image related information included in the headers of the JPG files (step S31).

Then, in the actual data part of the main image is embedded, as data, an image which is recognizable as a main-image-missing multi-image (for example, the image including character information such as "the image is a multi-image, but the main image is missing") (step S32).

When it is determined in step S28 that the JPG file of the main image is included in the selected image file groups, and when it is determined in step S30 that the JPG file of the main image was found as a result of searching, or when the main image is created by performing the processing in steps 31 and 32, the total sub-image number N is subsequently acquired from the main image JPEG header (step S33) and the variable i is reset to 0 (step S34).

Next, the variable i is increased by 1 (step S35), and thereafter the sub-image i information recorded in the main image JPEG header is referred to (step S36). Then, determination is made on whether or not an image corresponding to the identification number in the sub-image i information exists in the image file groups selected in the step S21 (step S37).

When it is determined that the corresponding image exists, the corresponding selected image is added to the multi-image file (however, when i is equal to 1, the file is not yet the "multi-image file" but the "main image file". Accordingly, the corresponding selected image is added to the main image file) (step S38). On the other hand, when it is determined that no corresponding image exists, the image type in the sub-image i information is changed to "no image" (step S39).

After performing the processing in the step S38 or S39, determination is made on whether or not i is smaller than N (step S40). When i is smaller than N, the procedure returns to step S35 and the processing described above is repeatedly performed on the next sub-image. On the other hand, i is equal to or larger than N, the processing is terminated.

Note that, in the processing shown in FIG. 9, the user selects the image file groups from which the multi-image file is to be reconstructed. However, it is needless to say that there is no limitation placed thereon. For example, if the user specifies only one JPG file for reconstructing the multi-image file, by searching for the header information of each of the JPG files in the recording medium 13, the JPG files divided from the same multi-image file as one from which the specified JPG file is divided are automatically searched for, thereby the original multi-image file may be reconstructed. Alternatively, it is also possible to collectively reconstruct the reconstructable multi-image files by a full automatic processing in the recording medium 13.

According to the embodiment 1 thus configured, when the multi-image file including a plurality of image data is divided into a plurality of "image files each including one image data", related information necessary for reconstructing the multi-image file later is added in the headers of image files to be divided. Therefore, it is possible to reunite the image files to reconstruct the multi-image file of the original configuration relatively easily.

The divided image files can be displayed, edited, or distributed by multi-image non-compliant software. At this time, the JPG files divided from the multi-image file are in a de facto standard format complying with the Exif standard, which can maintain the compatibility with the JPEG-compliant apparatuses, increase the versatility, and improve the convenience.

Since the related information is recorded, after editing the JPG files obtained by division, the multi-image file is reconstructed based on the edited JPG files, thereby facilitating the file management again.

Furthermore, since the total sub-image number is recorded as the related information, and the information obtained by referring to the sub-image information recorded in the header area of the main image is recorded as the sub-image related information, even if the main image is missing in the image file groups for reconstructing the multi-image file, the header of the main image can be created, thereby enabling the format as the multi-image file to be adjusted. When the header of the main image is created, the data area having the size calculated by multiplying the total sub-image number by the size of one sub-image information area can be collectively ensured, thereby enabling high-speed header construction.

In addition, the image identification number is recorded as the related information, so that the order of the images in the multi-image file can also be restored. Even when there is a missing image in the reconstructed multi-image file, the portion of the number of missing image is left blank and the missing image can be added at a desired point.

Moreover, since the image type information is recorded as the related information, there is an advantage that the functions retained by the original multi-image file are not damaged when the multi-image file is reconstructed.

Furthermore, since the main image file identification information is recorded as the related information, it is possible to identify whether or not the JPG files after division are divided from the same multi-image file. In addition, the main image file identification information is used for automatically selecting the image file groups for reconstructing the multi-image, or for automatically searching for the main image when the main image is not included in the image file groups for reconstructing the multi-image.

Also, since the identifier is recorded as the related information, only the determination of the identifier makes it possible to easily identify whether or not the file is divided from the multi-image file.

Note that the multi-image file editing apparatus is mainly described above, and in FIGS. 8 and 9, description has been made that the processing may be performed by executing a multi-image file editing program on a computer. However, there is no limitation placed thereon, and the present invention may be employed in a multi-image file editing method for performing the same processing.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A multi-image file editing apparatus for editing a multi-image file including main image data representing one main image which is a representative of a plurality of images and one or more sub-image data representing one or more sub-images other than the main image, each of the main image data and the one or more sub-image data being provided with a header area, the multi-image file editing apparatus comprising:
   a related information recording section for recording related information indicative of a relationship between the main image data and the one or more sub-image data in the header area of the main image data and the header area of each of the one or more sub-image data;
   an image data dividing section for dividing the main image data and the one or more sub-image data included in the multi-image file into individual image files; and
   a multi-image file reconstructing section for reconstructing the multi-image file including a plurality of image data by uniting a plurality of image files, obtained by division from one multi-image file by the image data dividing section, based on the related information recorded in the header area of each of the image files.

2. The multi-image file editing apparatus according to claim 1, wherein a plurality of image files obtained by division from the multi-image file by the image data dividing section comply with an Exif standard.

3. The multi-image file editing apparatus according to claim 1, wherein information related to each of the one or more sub-image data included in the multi-image file is recorded in the header area of the main image data in the multi-image file, and
   the related information recording section refers to the information related to each of the one or more sub-image data recorded in the header area of the main image data in the multi-image file, generates related information to be recorded in the header area of the sub-image data, and records the generated related information in the header area.

4. The multi-image file editing apparatus according to claim 1, wherein the related information includes image type information indicative of a relationship 19 between the main image data and the one or more sub-images other than the main image at a time of shooting.

5. The multi-image file editing apparatus according to claim 1, wherein the related information includes main image file identification information for identifying a main image file which is an image file obtained by dividing the main image data by the image data dividing section.

6. The multi-image file editing apparatus according to claim 1, wherein the related information includes an identifier for identifying that an image file in which the related information is recorded is an image file obtained by dividing the multi-image file.

7. The multi-image file editing apparatus according to claim 1, wherein the related information includes information on a total number of the one or more sub-images included in the multi-image file.

8. The multi-image file editing apparatus according to claim 1, wherein the related information includes an image identification number showing that an image file is obtained by division based on which number of image data in the multi-image file before division.

9. A multi-image file editing method for editing a multi-image file including main image data representing one main image which is a representative of a plurality of images and one or more sub-image data representing one or more sub-images other than the main image, each of the main image data and the one or more sub-image data being provided with a header area, the multi-image file editing method comprising:
   recording, by a file editing apparatus, related information indicative of a relationship between the main image data and the one or more sub-image data in the header area of the main image data and the header area of each of the one or more sub-image data;
   dividing, by the file editing apparatus, the main image data and the one or more sub-image data included in the multi-image file into individual image files; and
   reconstructing, by the file editing apparatus, the multi-image file including a plurality of image data by uniting a plurality of image files that were obtained by the act of dividing, based on the related information recorded in the header area of each of the image files.

* * * * *